US006564394B2

(12) United States Patent
Falwell

(10) Patent No.: US 6,564,394 B2
(45) Date of Patent: May 20, 2003

(54) HEADWEAR USEFUL AS ANIMAL SHELTER

(76) Inventor: Robert L. Falwell, 5901 Hunter, Raytown, MO (US) 64133

( * ) Notice: Subject to any disclaimer, the term of this patent is extended or adjusted under 35 U.S.C. 154(b) by 4 days.

(21) Appl. No.: 09/975,467

(22) Filed: Oct. 9, 2001

(65) Prior Publication Data
US 2003/0066123 A1 Apr. 10, 2003

(51) Int. Cl.⁷ .................................. A42B 1/06
(52) U.S. Cl. .................. 2/410; 2/209.11; 2/209.13; 119/482; D30/111
(58) Field of Search .................. 2/410, 171, 171.4, 2/209.11, 209.13, 422; 119/482, 452, 459, 463; D30/108, 111, 112

(56) References Cited

U.S. PATENT DOCUMENTS

| 3,308,789 | A | * | 3/1967 | Artig | 119/482 |
| 4,802,443 | A | * | 2/1989 | Denmark | 119/482 |
| 5,791,293 | A | * | 8/1998 | Northrop et al. | D30/112 |
| D406,922 | S | * | 3/1999 | Darbutas | D30/111 |
| D417,527 | S | * | 12/1999 | Knuth et al. | D30/111 |
| 5,996,127 | A | | 12/1999 | Leslie | 2/422 |
| 6,450,126 | B1 | * | 9/2002 | Schellenbach | 119/537 |

* cited by examiner

Primary Examiner—Rodney M. Lindsey
(74) Attorney, Agent, or Firm—Christopher Whewell

(57) ABSTRACT

Provided herein are articles of headwear which comprise a top portion, a bottom portion, a right side portion, a left side portion, a front portion, and a rear portion, which collectively define a casing having an inner volume. The bottom portion is equipped with a removable closure means which has a flat surface to enable the headwear articles of the invention to rest in an upright position when placed on a flat surface. The headwear articles according to the invention have the dual function in that they are useful as feeders or shelters for small birds and other animals, and thus include at least one hole in either of the top portion, a right side portion, a left side portion, a front portion, and a rear portion to enable birds and/or small animals to enter the article when it is placed in a location where such small animals inhabit.

6 Claims, 6 Drawing Sheets

HEADWEAR USEFUL AS ANIMAL SHELTER

This invention relates to a headwear. More particularly, it relates to headwear which may be also used as a home or feeding device for a variety of flying animal life, including without limitation butterflies, birds, squirrels, and other small animals.

BACKGROUND

Various forms of headwear have been known since ancient times to confer upon the wearer a particular benefit not attainable without the headwear. For example, early warriors of various tribes, nations, cultures, as well as modern military regiments have worn headwear as a means of protection against the weaponry of adversaries. Headwear is also known to have been widely used ornamentally, as being a part of the dress used in religious ceremonies. Additionally, various headwear articles find use for protecting wearers from the rays of the sun, as in the cases of the well-known sombrero and common cowboy hat. Headwear may also function in a protective role, as in the case of various sports games where specifically-designed helmets or other headgear is required to protect a sports participant from injury.

Typically, a given article of headwear is designed for a specific use and thus comprises features unique to its particular intended end-use. Because of their specific design characteristics, individual articles of headwear are unsuitable as anything other than a hat or helmet in their intended use. Thus, according to the prior art, a hat, helmet, or other piece of headwear is useful only as a hat, helmet, or headwear article. Thus, if hats, helmets, or other pieces of headwear were to be possessed of a function other than merely being wearable on the head of a person, such articles would have extra value over similar items of the prior art which are currently being made and sold in commerce.

A major problem with the hats, helmets, and headwear articles of the prior art is that none of them thus far have proved suitable for use as a shelter or feeder for small birds, flying insects, and mammals or the like. This is due in part because in order to function as a shelter or feeder for such life forms, helmets, hats, or headwear should be able to keep the environmental elements of wind, snow, and rain from the interior volume of such headwear, while at the same time preferably affording some protection from predators. Headwear articles of the prior art do not provide such features adequately to function usefully as shelters or feeders for small birds, flying insects, and mammals or the like, while retaining their utility as an article of headwear.

U.S. Pat. No. 5,996,127 describes a wearable device for feeding and observing birds and other flying animals which comprises a hat, a support mounted on the hat and extending outwardly from the hat, and a feeder mounted on the support. When flying animals feed from the feeders, a person wearing the hat may observe them from a short distance. The device may comprise a helmet with three poles mounted on it and extending outwardly from the helmet, and a feeder hanging from each of the poles. The inventor of that device alleges that a variety of flying animals, including butterflies, hummingbirds, and other small birds may be observed using the device. However, while such a device may be used in observing the wildlife cited therein, the teachings of the '127 patent provide no particular sheltering means for any of the wildlife, even though the helmets or headwear articles described therein are capable of being worn by a person. The present invention, on the other hand, in one of its preferred forms, provides helmets or headwear articles described therein are capable of being worn by a person and which are additionally useful for providing food or shelter for the particular wildlife forms mentioned above.

SUMMARY OF THE INVENTION

The present invention is directed at an article of headwear also having utility as a feeder or home for small animals such as birds, squirrels, and the like, which comprises: a casing portion, that includes: a top portion; a right side portion; a left side portion; a front portion; a rear portion; and a bottom portion, wherein said bottom portion includes a removable closure means, which portions collectively define an interior volume within said casing. There is also at least one hole disposed through said casing portion, to enable said animals to enter said casing portion.

According to another form of the invention, such articles further include an animal support means disposed within the interior of said casing portion, particularly in which the animal support means is removable from the interior of said casing portion. Such animal support means may include a flat floor portion or a rod which transverses the interior of the casing portion. The removable closure means may comprise a flat lower surface.

There is a hole disposed through a portion of the casing selected from the group consisting of: the front portion; the rear portion; the right side portion; the left side portion; or the top portion. The casing portion is shaped as a headwear article selected, without limitation, from the group consisting of: football helmets, baseball helmets, automotive racing helmets, construction hats, hardhats etc.

DETAILED DESCRIPTION

Figure 1:
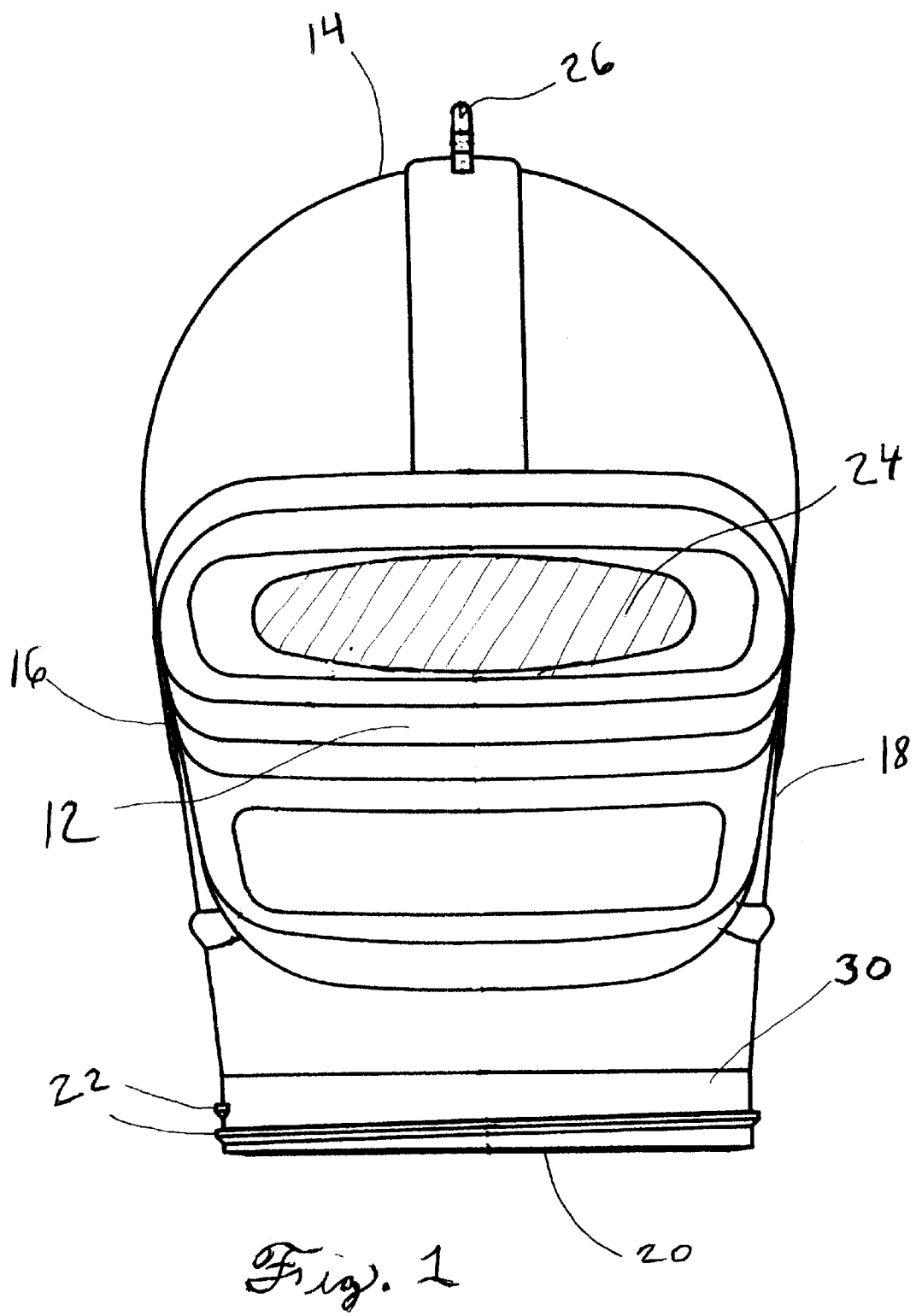
FIG. 1 is a frontal view of a headwear article according to one form of the invention.
Figure 5:
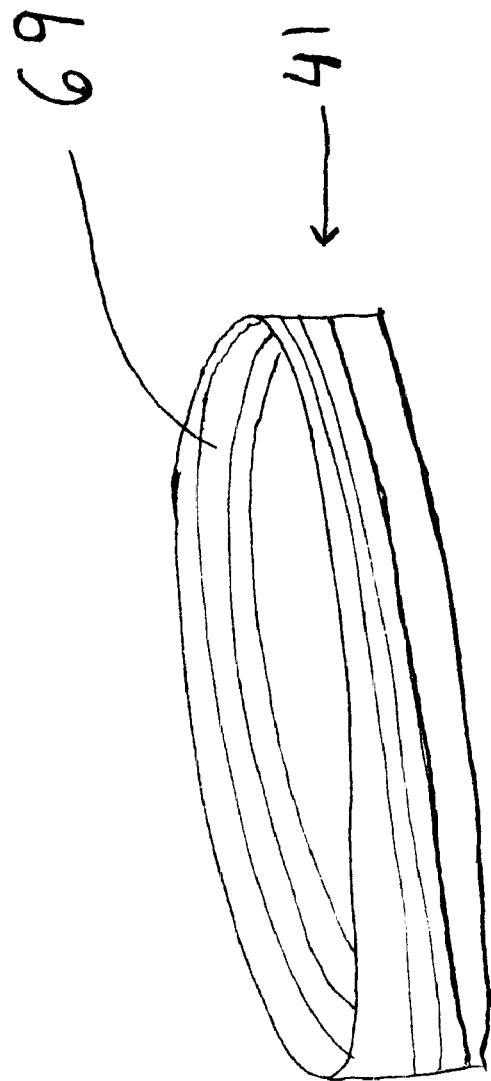
FIG. 5 is a perspective view of a screw-on lid according to the prior art.
Figure 6:
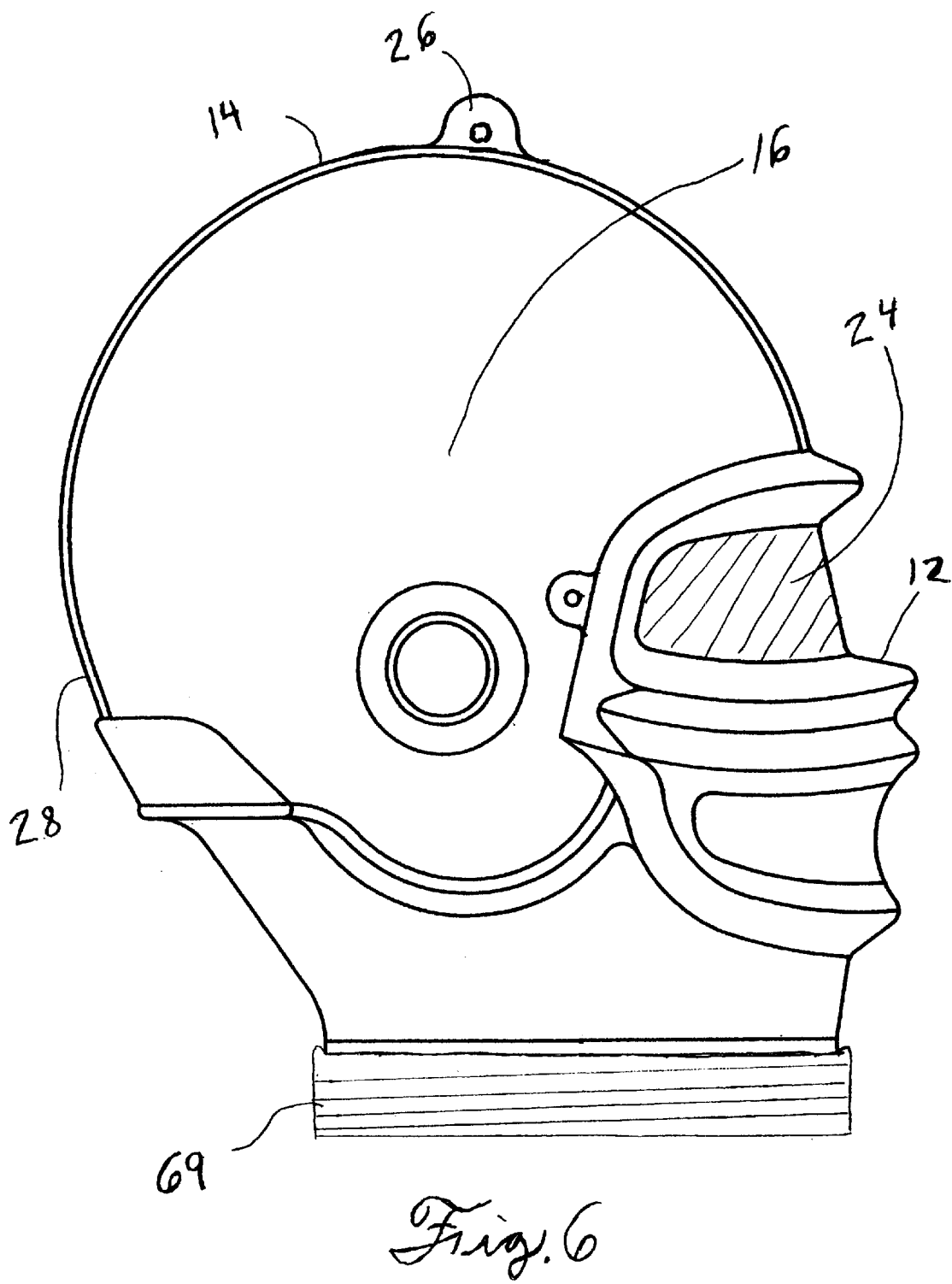
FIG. 6 is right-side view of a headwear article according to one form of the invention including a screw-on lid on its bottom portion.

Referring to the drawings and initially to FIG. 1, there is shown a headwear article according to a preferred form of the present invention. In this figure is shown top portion 14, right side portion 16, left side portion 18, and an open bottom portion 20. Collectively, the top portion 14, right side portion 16, left side portion 18, rear portion 28 (FIG. 2), and open bottom portion 20 all form a casing, and thus inherently define an interior volume within such casing. It is within this interior volume that the head of a wearer of such article resides when it is worn, the article being positioned about the head of a wearer by the wearer inserting their head through the open bottom portion 20 which is regarded as the conventional way to place a helmet or hat upon one's head. In addition, there is a hole 24 disposed through the front portion 12, which hole is so disposed to serve the function of enabling admission of small animals, birds, and the like into the interior volume of the casing when the article of the invention is employed as an animal feeder or shelter. In such instances, a closure means is preferably attached to the open bottom portion 20, preferably by engagement of such closure means with threads 22 that are disposed circumferentially about the lower portion 30 of an article according to the invention. Such closure means in one preferred form consists merely of a lid 41 (FIG. 5) having threads 69 on its inner portion which are complementary to those 22 disposed circumferentially about the lower portion 30 of an article according to the invention. It is preferred that the closure means comprise a sufficiently flat surface so as to enable the headwear article of the invention to rest in an upright position when placed on a flat surface such as a table, rock, the ground, etc. Preferred closure means include screw-on lids, which are well-known in the art.

Figure 2:
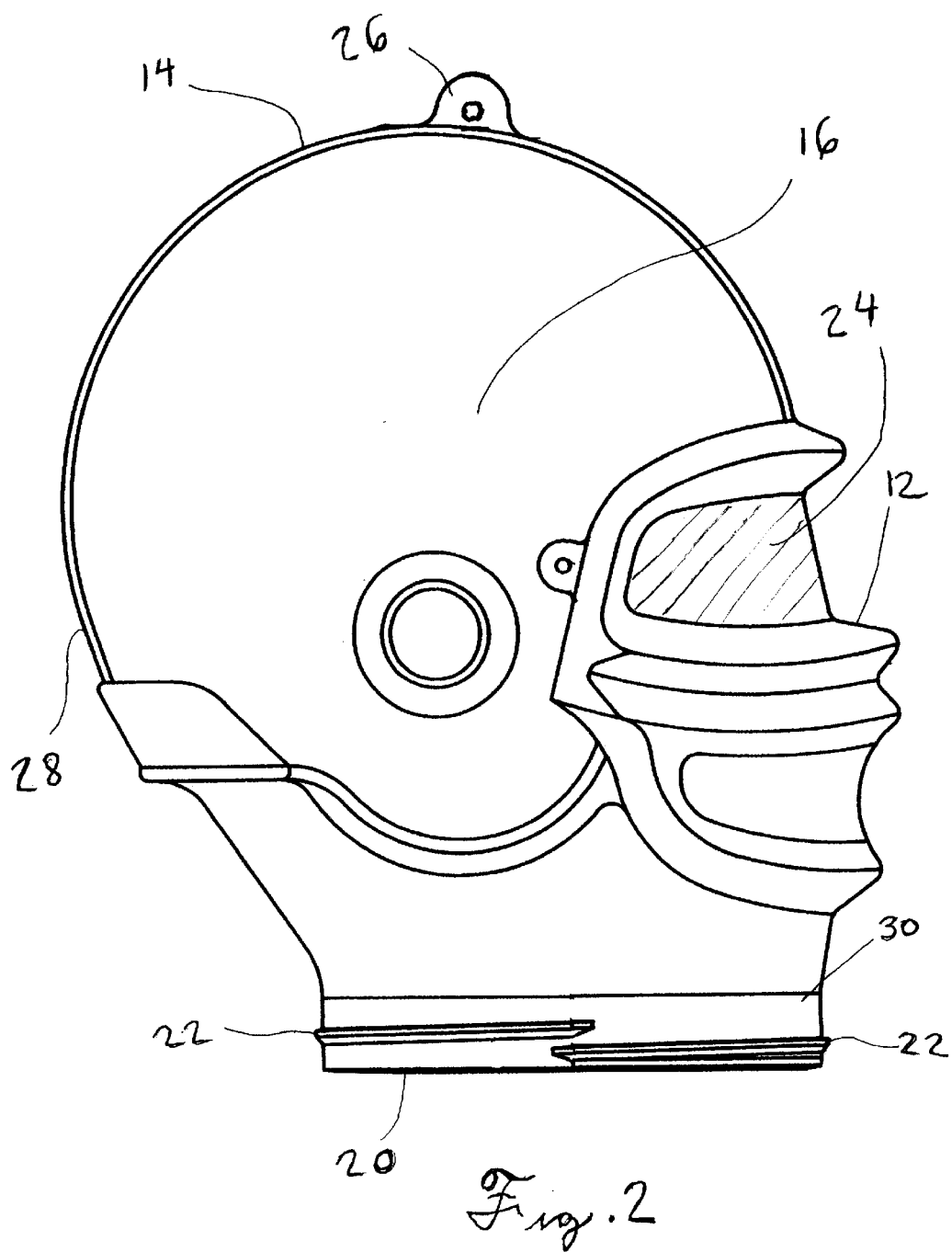
FIG. 2 is a right-side view of a headwear article according to one form of the invention.

FIG. 2. shows a right-side view of a headwear article according to one form of the invention, in which 12 is the front portion of the article, 16 is the right side portion of the article, 14 is the top portion of the article, 20 is the open bottom portion of the article having threads 22 disposed circumferentially about the lower portion 30 of the article. There is a hole 24 disposed through the front portion 12. Also shown is a loop portion 26 disposed at the top portion 14, which loop is functional to enable a person to hang such a headwear article to say, a tree or other stationary object, when it is desired to employ an article according to the present invention as a bird feeder.

Figure 3:
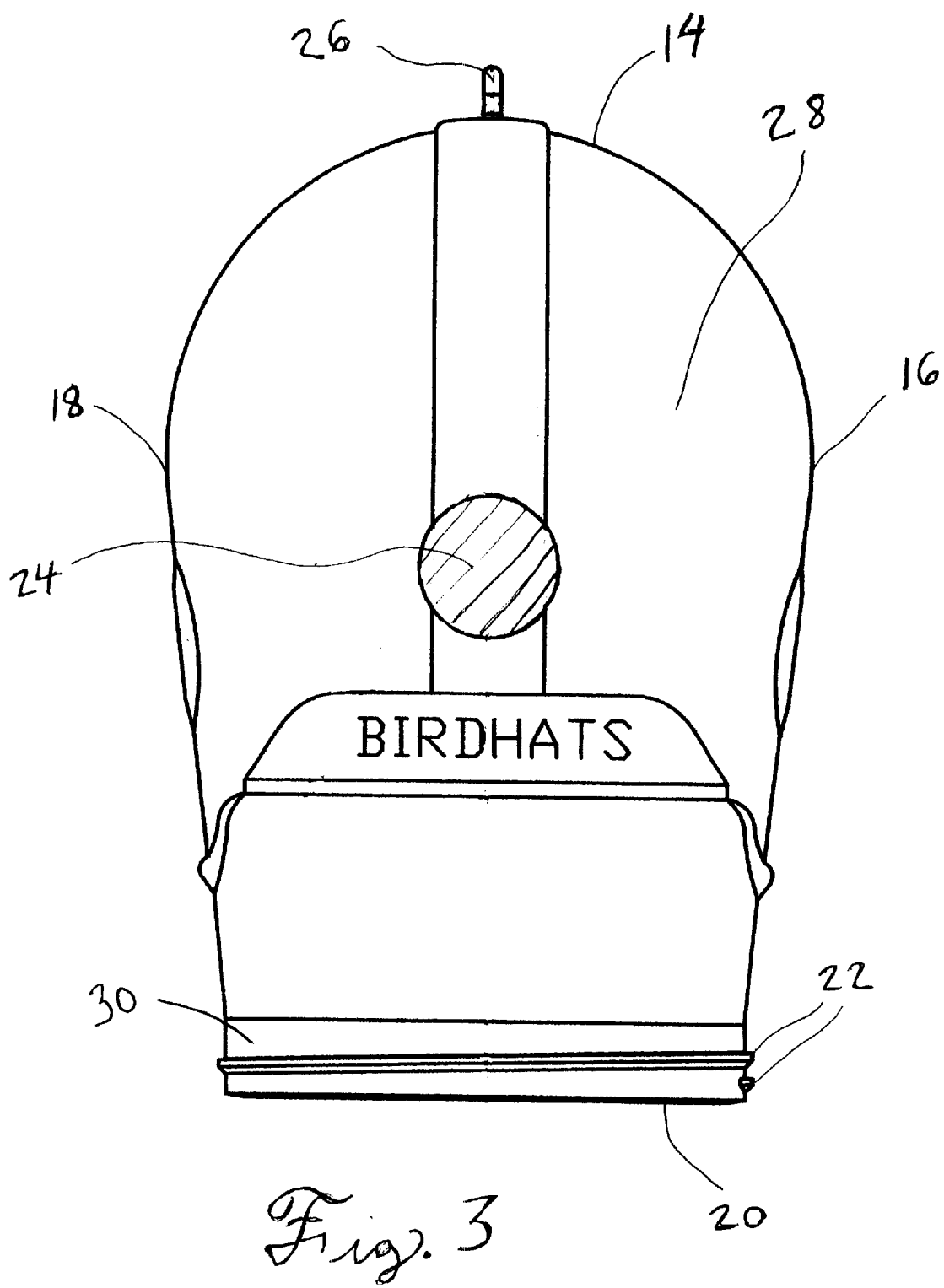
FIG. 3 is a rear view of a headwear article according to one form of the invention.

FIG. 3 is a rear view of a headwear article according to one form of the invention showing top portion 14, right side portion 16, left side portion 18, the open bottom portion 20 of the article having threads 22 disposed circumferentially about the lower portion 30 of the article, and loop 26. In this embodiment, the hole 24 is disposed through the rear portion 28 in a central location. There is a loop 26 disposed at the top portion 14 to enable hanging of the article from a stationary object such as a tree or pole.

Figure 4:
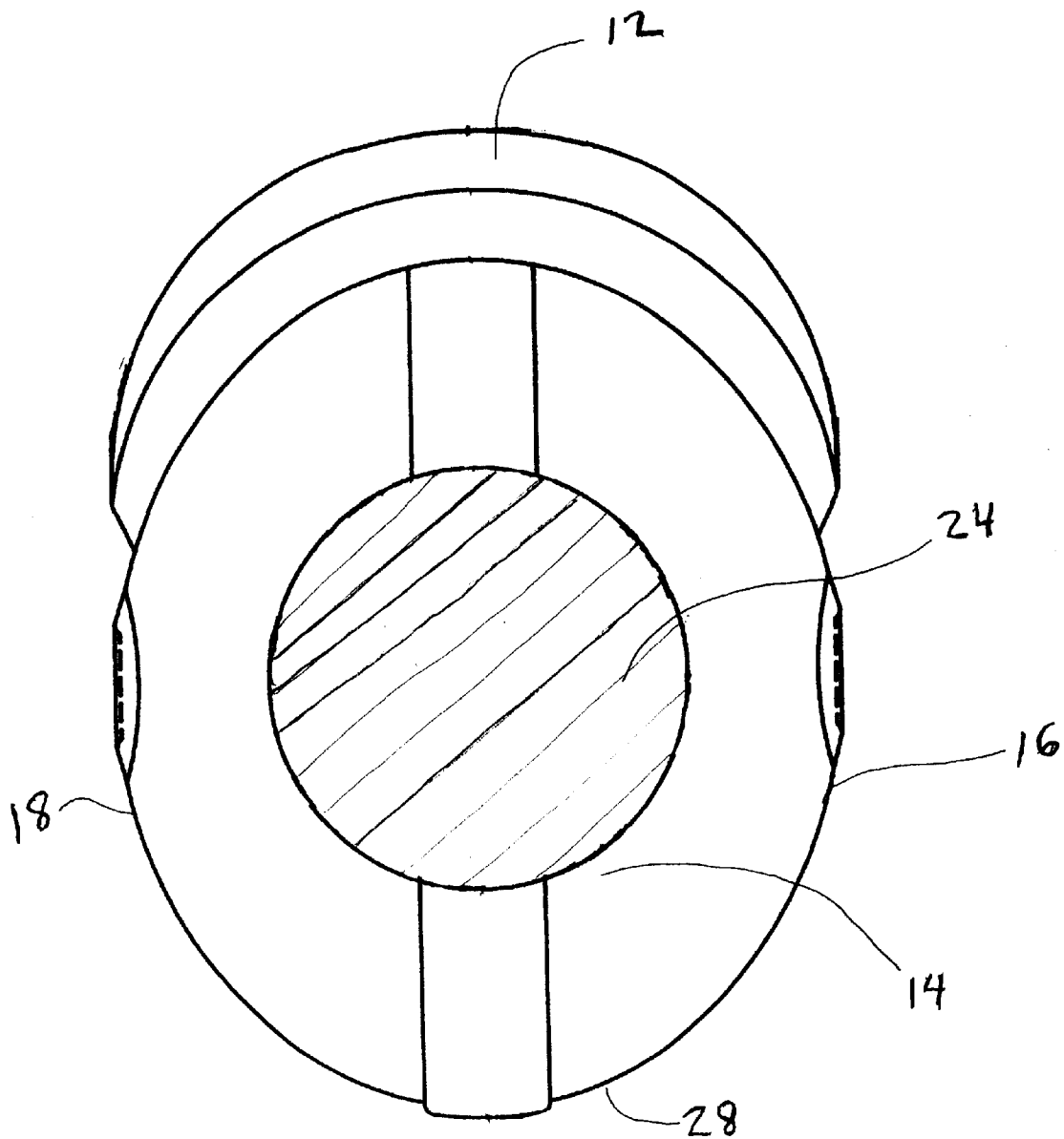
FIG. 4 is a top view of a headwear article according to one form of the invention.

FIG. 4 is a top view of a headwear article according to one form of the invention, showing the top portion 14, right side portion 16, left side portion 18, the front portion 12, the rear portion 28, and a hole 24 disposed through the top portion 14. In this embodiment, the hole 24 in the top portion 14 enables small animals such as birds or the like to enter the casing, when the headwear article of the invention is used as an animal feeder. Alternatively, such embodiment is contemplated as being useful as a cup-holder or planter.

The present invention is directed at an article of headwear also having utility as a feeder or home for small animals such as birds, squirrels, and the like, which comprises: a casing portion, that includes: a top portion; a right side portion; a left side portion; a front portion; a rear portion; and a bottom portion, wherein said bottom portion includes a removable closure means, which portions collectively define a closed interior volume within said casing. According to a preferred form of the invention, the bottom portion is provided with a removable closure means, which closure means preferably comprises a flat surface, in order to enable an article of headwear according to the invention to rest upon a flat surface upon which it is placed, such as, the ground, a picnic table, a tabletop, flat rocks, etc. According to one preferred form of the invention, the closure means comprises s a screw-on lid having inner threads which are complementary to the threads 22 disposed circumferentially about the lower portion 30 of the article. Using a screw-on lid is of benefit to not only enabling an article of headwear according to the invention to rest upon a flat surface, but is instrumental as well towards making the article as a whole relatively sealed from environmental conditions, such as rain, sleet, snow, wind, etc., and protects animals which are inhabitant to the article from invasion by other pests such as snakes, mice, insects, etc. In addition, it is natural for excrement and the like which is generated by animals which are inhabitants of an article according to the invention to accumulate. The use of a removable closure means such as a screw-on lid enables easy cleaning of an article according to the invention. Materials of construction of an article of headwear may be any material such as wood, metal, fabric, polymers, etc.; however, it is especially preferred that an article of headwear according to the invention be comprised of a polymeric material. Suitable polymeric materials include any polymer known to those skilled in the art as being useful in conventional injection molding equipment. Such polymers include polyalphaolefin polymers such as polyethylenes, polypropylenes, polybutylenes, whether homopolymers or copolymers with other monomers recognized by those skilled in the art as being copolymerizable with the alphaolefin monomer employed. Typically polyalpha olefins useful according to the invention include polymers and copolymers of any $C_2$ to $C_8$ alpha olefin with one or more alpha olefins having any number of carbon atoms between 2 and 8, or with other monomers such as vinyl acetate. It is most preferable that the polymer used be either a high crystallinity polypropylene homopolymer or copolymer with ethylene, or a polyethylene. Alternative polymers include acrylonitrile butadiene styrene polymers, polyethylene terephthalate, polycarbonate, HDPE, and polyvinyl chloride ("PVC") or CPVC.

In addition to the open bottom portion 20, there is also at least one additional hole 24 disposed through said casing portion, to enable said animals to enter said casing portion. Such hole may be disposed on any one or more of the front portion, rear portion, left side portion, right side portion or top portion. In many cases a user of an article of headwear according to the invention will find that it is most preferable to custom tailor the size of the hole for a given species of bird, while an article according to the invention is being employed as a bird house. The size of the hole needed to attract various bird species is well known in the field of ornithology.

In most instances when using the present invention as a bird house, it is preferable to locate the hole 24 on the front portion, rear portion, left side portion or right side portion. In one preferred form of the invention, the hole portion 24 is disposed on the front portion. In another preferred form of the invention, the hole portion 24 is disposed on the rear portion. In another preferred form of the invention, the hole portion 24 is disposed on the top portion.

In order to maximize convertibility of an article according to the present invention between its role as an animal shelter/feeder and headwear article, it is most preferable to locate the hole portion 24 on the front of the headwear article, to correspond substantially with the eyes of a wearer of the headwear article, although such is not absolutely necessary, for the present invention may also be used as a sleep aid for persons with various sleep disorders, to exclude sight and sounds from the surroundings, and in such cases where a headwear article according to the invention is so employed, the location of the hole 24 may be disposed at a location which substantially coincides with the mouth or nose of the person wearing the article to facilitate their breathing.

While it is in many cases desirable to confer the shape of roundness upon the hole 24, it is within the scope of the invention to employ holes having other geometries, such as square holes, oval holes, rectangular holes, elliptical holes, triangular holes, pentagonal holes, hexagonal holes, rhombohedral holes, etc. According to one preferred form of the invention, the hole portion 24 is substantially oval shaped and is disposed on the front portion of a headwear article of the invention in a location which substantially coincides with the eyes of a wearer of such article.

When employed as a birdhouse, bird feeder, or shelter for small animals, an article according to the invention may be provided with structural elements on the interior of the article according to the invention, to provide a perching means or floor portion upon which such birds or small animals may walk or sleep, thus insulating them from direct contact with the closure means. Such structures may merely be a flat floor portion which is held in place within the interior of the headwear article using conventional fastening means such as brackets and screws, hot melt glue, twine, rivets, staples, etc. According to one preferred form of the invention, the floor portion is a removable wire mesh which enables droppings, etc. to fall away from the floor surface. In another embodiment, the floor portion is a flat piece of wood. In yet another invention, the floor portion is merely a dowel rod which transverses the interior portion from any selected wall portion of the interior volume of the headwear to another section of the wall portion. According to one preferred form of the invention, the structural element is a wooden dowel which transverses the interior volume of a headwear article according to the invention between locations which substantially coincide with the location of the ears of a wearer of such headwear article.

While the removable closure means in a preferred embodiment comprises a screw-on lid 41 (FIG. 5), other removable closure means known in the art are functionally-equivalent to the screw-on lid, including zippered lids, lids with notches spaced to cooperatively connect with pins which protrude axially from the lower portion 30, snaps, hook and loop type fasteners, etc.

A headwear article according to the invention may come in different sizes, just as any article of headwear, to suit the head size of the wearer; thus an article according to the invention may be worn by persons having heads of all sizes, from infants to fully grown adults. In order to wear a headwear article according to the invention which has been employed as a bird house, feeder, shelter, etc., the removable closure means is first removed, and the inside of the headwear article is cleaned using conventional cleansers. Optionally, the interior portion may be soaked with a disinfectant, such as aqueous chlorine bleach.

Although in the drawings, the casing portion is shaped as a football helmet, a headwear article according to the invention may resemble various known articles of headwear article selected, without limitation, from the group consisting of: football helmets, baseball helmets, automotive racing helmets, construction hats, hardhats etc., provided that there is a hole disposed through a portion of the casing selected from the group consisting of: the front portion; the rear portion; the right side portion; the left side portion; or the top portion, and provided that the bottom portion is fitted with a removable closure means having a flat surface which enables the headwear article as a whole to be rested upon a flat surface in an upright position.

According to one embodiment of the invention, the casing portion has no hole disposed through any of the right side portion, left side portion, top portion, front portion, top portion, or rear portion, but only comprises a hole at the bottom portion. Such an embodiment renders a headwear article according to the invention suitable for use as a home for woodpeckers, which are known to prefer to make their own holes for a home or nesting spot. Such embodiment is also beneficial in rendering a headwear article useful as a bat house, by making the only entranceway the hole at the bottom portion 20.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

I claim:

1. An article of headwear having utility as a feeder or home for small animals such as birds, squirrels, and the like, which comprises:
   a) a casing portion, which comprises:
      i) a top portion;
      ii) a right side portion;
      iii) a left side portion;
      iv) a front portion;
      v) a rear portion;
      which portions collectively define an interior volume within said casing, and
      vi) a bottom portion, wherein said bottom portion includes a removable closure means; and
   b) at least one hole disposed through any portion of said casing portion, to enable said animals to enter said casing portion.

2. An article according to claim 1 wherein said removable closure means comprises a flat lower surface.

3. An article according to claim 1 wherein said hole is disposed through a portion of said casing selected from the group consisting of the front portion; the rear portion; the right side portion; the left side portion; or the top portion.

4. An article according to claim 3 wherein said hole is circular and has a diameter in the range of between 0.10 and 4.00 inches, including every hundredth inch therebetween.

5. An article according to claim 3 wherein said hole is substantially elliptical, and has a longest dimension of any length between 1.00 and 8.00 inches and a shortest dimension of any length between 0.25 and 2.00 inches.

6. An article according to claim 1 wherein said casing portion is shaped as a headwear article selected from the group consisting of: football helmets, baseball helmets, automotive racing helmets, bicycle helmets, army helmets, motorcycle helmets, fireman's helmets, hardhats, and police helmets.

* * * * *